Dec. 27, 1955     W. A. KEARNEY     2,728,898

ELECTRIC CABLE TERMINAL

Filed Dec. 7, 1953

INVENTOR.
William A. Kearney
BY
AGENT

United States Patent Office 2,728,898
Patented Dec. 27, 1955

2,728,898

ELECTRIC CABLE TERMINAL

William A. Kearney, Portland, Oreg.

Application December 7, 1953, Serial No. 396,578

2 Claims. (Cl. 339—226)

This invention relates generally to electric cable terminal fittings adapted removably to connect electric cables to the terminal posts of electrical apparatus but more particularly to electric cable terminals adapted to be removably connected to the starting and lighting batteries of automotive equipment.

Specifically this invention provides an improved terminal for an automobile battery cable.

So far as known all of the battery cable terminals now in use comprise a bifurcated lead yoke molded onto a stranded copper wire cable and formed between its split ends with a conical gap adapted to fit the conical lead terminal post of the battery. The conical gap wall is discontinuous towards the end of the cable terminal away from the cable so that the gap opens between the legs of the bifuracted end of the cable terminal. Transversely of the conical gap in the cable terminal, the outer ends of the terminal legs are formed with registering clearance holes therethrough adapted to receive a headed steel bolt which together with a steel nut threaded thereon is adapted to clamp the legs of the terminal together and thereby clamp the cable terminal onto the battery terminal post.

The presently used cable terminal as above described works nicely when new and first applied but it should be remembered that the cable terminal is molded of malleable lead which is relatively soft compared to the steel bolt and has little if any resilience or elasticity. Thus the cable terminal is formed around the battery post as the nut is tightened on the bolt and the cable terminal is more or less deformed in application. Should the attachment become loosened in service and retightened with the bolt holes somewhat deformed the lead of the terminal gets into the threads of the bolt and causes difficulty in manipulation.

Or if the cable terminal remains tight on the post and becomes somewhat corroded due to spilled battery acid it may be difficult to remove even after the corroded bolt is loosened. It is then necessary to pry the ends of the terminal apart with a screw driver or other tool and the terminal is further deformed. These deformations in use are cumulative so that the terminal becomes unfit for use and its continued use gives trouble with the electric system of the vehicle.

It has been discovered that by the means of this invention a cable terminal is provided which greatly lessens or obviates the difficulties above noted which is the primary object of the invention.

A second object is to provide an improved cable terminal which is low in first cost and has a long useful life.

A third object is to provide an improved cable terminal having no removable or losable parts.

A fourth object is to provide an improved cable terminal requiring only one wrench to apply or remove from the battery post.

How these and other objects are attained is explained in the following description referring to the attached drawing in which—

Like numerals of reference refer to like parts in the several figures of the drawing.

Figure 1:
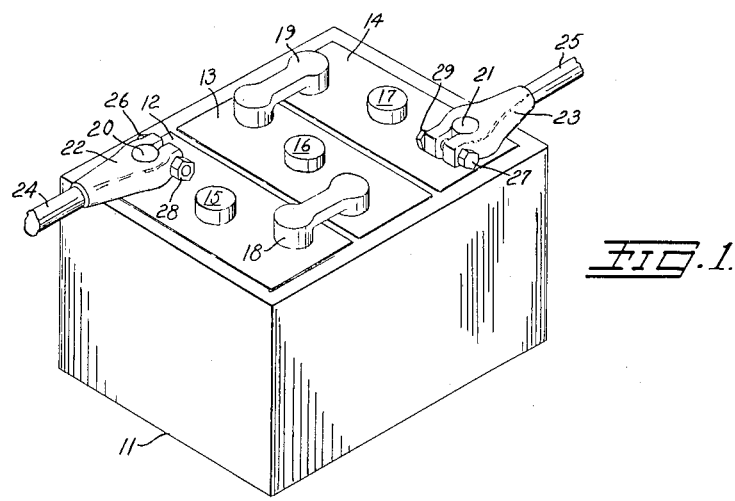
Fig. 1 is a perspective view of a common automobile electric battery with the commonly used cable terminals attached to the posts thereof.

Referring now to the drawing in Figure 1 is shown a common type of three cell, or six volt, lead storage battery comprising a rubber container or battery box 11 into which is potted with a bituminous sealing compound three lead battery cells 12, 13, and 14 of well known type having electrolyte filling hole covers 15, 16 and 17 and lead cell connectors 18 and 19. On terminal posts 20 and 21 of the battery are clamped as shown cable terminals 22 and 23 molded onto electric cables 24 and 25, respectively. Terminals 22 and 23 are seen to be clamped in place by threaded through bolts 26 and 27 having nuts 28 and 29 respectively threaded thereon.

Figure 2:
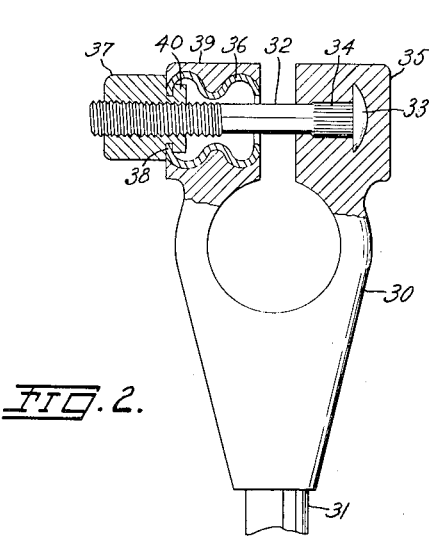
Fig. 2 is a plan view in partial section of one form of the cable terminal of this invention.

In Fig. 2 is shown one form of the improved cable terminal 30 of this invention molded onto cable 31. Clamping bolt 32 of the carriage bolt type having a button head 33 and knurled under the head as at 34 is molded into leg 35 of terminal 30 as shown. Corrugated bushing 36 of circular section throughout but of varying diameter as shown is molded into the other leg 39 of terminal 30. Bushing 36 is split longitudinally in a plane including its axis in order that before it is molded into leg 39 it can be assembled on nut 37 with its inwardly turned outer end 38 rotatably received into the mating angular groove in nut 37. Nut 37 with bushing 36 assembled thereon is, of course, threaded onto bolt 32 as shown before the head end of bolt 32 and the bushing 36 are molded into legs 35 and 39 respectively of terminal 30. A small amount of looseness between the inwardly turned end 38 of bushing 30 and its mating groove in nut 37 together with the internal clearance of bushing 36 from the outside of bolt 32 allows some rocking or universal action of nut 37 with respect to leg 39 as nut 37 is advanced on bolt 32 to clamp terminal 30 on a battery post.

To remove terminal 30 from a battery post on which it is clamped it is only necessary to back nut 37 a few turns off of bolt 32 which action will withdraw leg 39 away from leg 35 by the pull of the head 40 of nut 37 on the inner side of end 38 of bushing 36.

It is thus seen that with one hand and one wrench to turn nut 37 the improved terminal 30 of this invention can be repeatedly attached or removed from a battery post without mutilation of either part.

Figure 3:
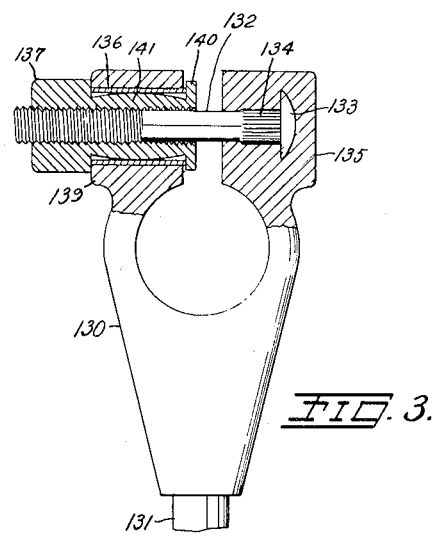
Fig. 3 is a plan view in partial section of another form of the cable terminal of this invention.

Another form of my cable terminal is shown in Figure 3 in which split cylindrical bushing 136 is assembled onto the crowned barrel 141 of spool nut 137 threaded onto bolt 132 after which the head 133 of knurled portion 134 are molded into leg 135 of terminal 130 and bushing 136 is molded into leg 139 of terminal 130. In this form the crowned barrel of spool nut 137 gives a small universal action to nut 137 in bushing 136. Similarly to my terminal form of Fig. 2, my terminal form of Fig. 3 can be attached to or loosened from a battery post merely by turning the outer end of nut 137. Head 140 of nut 137 pulls leg 139 away from leg 135 when nut 137 is backed off on bolt 132.

It is thus seen that my invention provides an improved cable terminal in which all parts including the attachment means are permanently assembled on the terminal and in which only one part is movable with respect to the remainder, this part being exposed for manipulation to attach or remove the terminal from a battery post.

In the two forms shown a threaded shaft is immovably secured in the terminal and a movable nut adapted to cooperate therewith is manipulated to attach or remove the terminal.

It is equally within the bounds of my invention to reverse the operation of the parts and imbed a nut element in each of the legs of the terminal and before such placement to thread these nuts on a threaded shaft one end of which would be extended to the outside of the terminal and provided with a squared end or some other form for wrench attachment to turn the shaft to attach or remove the terminal from a battery post. It is understood, of course, that in this case one end of the shaft and one nut would have to be threaded of opposite hand to the threading of the other nut and the other end of the shaft.

Having thus recited some of the objects of this invention, illustrated and described preferred forms, in which the invention may be practiced and explained the operation thereof, it is apparent that many simple variations of form of the means for practicing the invention will occur to those to whom the invention is here disclosed and I intend to hold for myself all such forms as rightly come within the range of my teaching.

I claim:

1. An automobile battery cable terminal adapted to resist mutilation is assembly and disassembly from a battery terminal comprising a molded lead alloy malleable body member, having a cable terminal end and a bifurcated opposite end, and means for clamping the two extending arms of said bifurcated end onto a battery terminal, said last mentioned means comprising a longitudinally split rigid metal bushing permanently fixed into one of said arms transversely thereof, a rigid metal nut rotatably and rockably secured to said bushing substantially axially thereof, a rigid metal bolt having one end threadably engaged in said nut and its other end embedded fixedly in the other of said arms, the arrangement being such that as said nut is rotated about said bolt forcibly to engage said bushing to change the lateral spacing of said arms in either direction for tightening or loosening said cable terminal on said battery terminal no part of said rotating nut will forcibly engage said malleable lead alloy thereby to destroy the repeated usefulness of said cable terminal.

2. In a molded lead alloy battery cable terminal having a cable terminal end and a bifurcated battery terminal end, means for varying the spacing of the two prongs of the bifurcated end for the purpose of assembling said cable terminal by its bifurcated end to a battery terminal or disassembling said cable terminal from said battery terminal, said means comprising a stud secured at one end in the free end of one of said two prongs transversely thereof, the other of said prongs being formed with a hole therethrough approximately coaxial with said stud, said stud extending through said hole, said stud being formed with external threads along its free end, a nut, formed with an internally threaded hole therethrough, said nut being threadedly engaged on the free end of said stud, said nut being formed with an annular groove thereabout, a bushing coaxial with said hole forming the wall of said hole and said bushing being engaged with said nut at said groove to limit the axial and radial motion of said nut with respect to said bushing.

References Cited in the file of this patent
UNITED STATES PATENTS

| | | |
|---|---|---|
| 1,959,713 | Goff | May 22, 1934 |
| 2,032,834 | Bunker | Mar. 3, 1936 |
| 2,086,048 | Redinger | July 6, 1937 |
| 2,140,843 | McGinnis | Dec. 20, 1938 |
| 2,142,759 | Plachy | Jan. 3, 1939 |
| 2,156,411 | Thomas | May 2, 1939 |